UNITED STATES PATENT OFFICE.

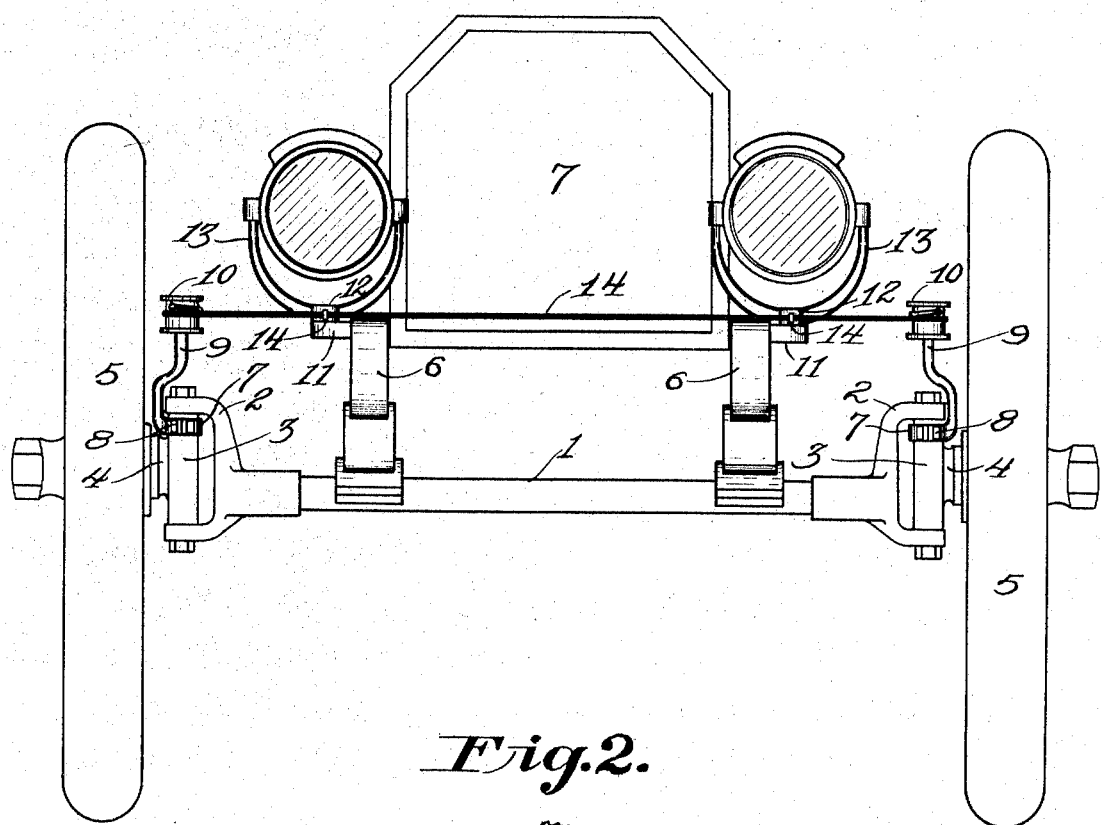
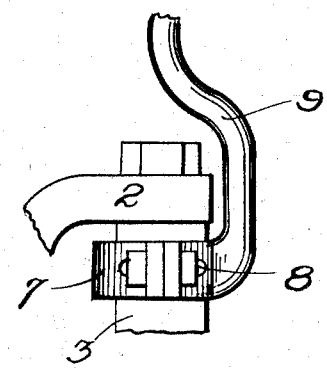

ALFRED H. LENT, OF OAKLAND, CALIFORNIA.

PIVOT-LIGHT.

967,205.  Specification of Letters Patent. Patented Aug. 16, 1910.

Application filed July 16, 1909. Serial No. 508,001.

*To all whom it may concern:*

Be it known that I, ALFRED H. LENT, citizen of the United States, residing at Oakland, in the county of Alameda and State of California, have invented certain new and useful Improvements in Pivot-Lights, of which the following is a specification.

This invention relates to headlight operating mechanism for automobiles by means of which said headlights are turned with the steering gear so that their rays will be projected in the direction of travel of the vehicle.

The principal object of the invention is to provide a simple but effective cable connection between the turning knuckles of the steering gear and the lamp forks by means of which the slightest movement of said knuckles will be immediately imparted to the headlights.

In carrying out the objects of the invention generally stated above, it will, of course, be understood that the essential features thereof are necessarily susceptible of changes in details and structural arrangements, one preferred and practical embodiment of which is shown in the accompanying drawings wherein—

Figure 1 is a view in front elevation of a motor vehicle equipped with the improved headlight operating attachment. Fig. 2 is a detail view showing the connection between one of the cable supports and one of the turning knuckles.

Referring to the drawings by numerals, 1 designates the front axle of a motor vehicle, the ends of which each carry a fork 2 which engages the ends of shaft 3 carried by the hub 4 of the steering wheels 5. This structure is well known in the art as a knuckle joint connection. Springs 6 are clipped to the axle 1 and support the body 7 of the motor vehicle.

The shaft 3 of each turning knuckle is embraced by a spring clip 7 which is held detachable thereon by means of a bolt 8. An upstanding arm 9 projects from each clip 7, the upper end of said arm having a spool 10 mounted thereon.

The springs 6 carry the usual brackets 11 in which the shaft 12 of the lamp forks 13 are mounted.

A cable 14 has its ends wound about and fastened to the spools of the turning knuckles, said cable also being fastened to the shafts 12 of the lamp forks 13 by staples 14 or the like.

It will be seen from the foregoing that a movement of the turning knuckles is immediately imparted to the lamp forks through the arms, spools and cable, so as to assure of the lamps turning with the steering gear.

A prominent feature of the invention is in the use of the spring clips for detachably holding the spool supporting arms in an operative position, and it will be seen that the same permits the arms to be readily removed when necessary or desirable.

What I claim as my invention is:—

1. In a motor vehicle, the combination with the steering gear and the lamp forks, of arms connected to said gear, a spool carried by each arm, and a cable having its ends connected to said spools and its intermediate portion connected to said lamp forks.

2. In a motor vehicle, the combination with the turning knuckles of the steering gear and the lamp forks, of an arm detachably connected to each knuckle, a spool carried by each arm, and a cable having its end fastened to said spools and its intermediate portion fastened to said forks.

3. In a motor vehicle, the combination with the turning knuckles of the steering gear and the lamp forks, of a spring clip detachably connected to each knuckle, an arm carried by each clip, a spool on said arm, and a cable having its ends wound about and fastened to said spools and its intermediate portion fastened to said forks.

In testimony whereof I affix my signature in presence of two witnesses.

ALFRED H. LENT.

Witnesses:
 H. C. SCHROEDER,
 F. P. SCHROEDER.